United States Patent Office 3,520,842
Patented July 21, 1970

3,520,842
WAX-POLYOLEFIN EMULSIONS
Robert B. Crean, Searington, N.Y., assignor to Mobil Oil Corporation, a corporation of New York
No Drawing. Filed Sept. 2, 1966, Ser. No. 576,869
Int. Cl. C09k 3/00
U.S. Cl. 260—23                    11 Claims

ABSTRACT OF THE DISCLOSURE

A method for producing an air-free wax-polyolefin emulsion comprising: forming a blend of petroleum wax, a polymeric olefin material, and a fatty acid, adding the blend to water containing an amine soap-forming agent, agitating the mixture, and subjecting the mixture to homogenization. The emulsions produced are useful coatings for both metallic and non-metallic surfaces.

---

This invention relates to wax-polyolefin emulsions, and more particularly to improved wax-polyolefin emulsions suitable for use as uniform, smooth, protective coatings for various types of surfaces, both metallic and non-metallic.

Wax-polyolefin emulsions have heretofore been employed for such purposes as protective anti-oxidative and anti-corrosive coatings for a wide variety of metals, or as protective water-proofing coatings or liners for such non-metallic materials as paper, paper-board containers or wrappers, for foods, beverages and other types of solids or liquids. Prior to the present invention, a common method for preparing such emulsions was to heat the wax polymer phase, containing emulsifying agents, to elevated temperature to render it fluid at temperatures of the order of about 250° F., and then to pour it into water maintained at a temperature of about 200° F., followed by agitation of the resulting mixture, and rapid cooling to room temperature. The emulsions produced by such methods have, however, exhibited air-entrainment and foaming tendencies, and have also been coarse-grained, possessing relatively high viscosities and not easily water-dispersible on dilution.

In accordance with the present invention, and its objects, new and improved wax-polyolefin emulsions are provided by a method which makes possible the production of wax-polyolefin emulsions which are free of excessive amounts of foam, contain relatively smaller size component particles and are easily water-dispersible. In general, as more fully hereinafter described, the improved emulsions of the present invention are prepared by a method which comprises forming a mixture comprising a petroleum wax, a polymeric olefin material and a fatty organic acid having at least about 12 carbon atoms per molecule; heating the mixture thus formed to a temperature sufficient to liquefy and form a blend, but not higher than the oxidation temperature of the components thereof; adding the thus-formed liquefied blend to water containing an amine soap-forming agent; subjecting the resulting mixture, maintained at a temperature which is below the foaming temperature of the components contained therein, to agitation to form an aqueous dispersion of wax and polymer components; and subjecting the thus-formed aqueous dispersion to homogenization at elevated pressure to obtain a substantially air-free wax-polyolefin emulsion.

The petroleum waxes employed to form the aforementioned blend may include paraffin waxes, microcrystalline waxes, and intermediate waxes, or blends of any of these waxes. Paraffin waxes used herein have a melting point from about 120° F. to about 160° F. Preferred, however, are those having a melting point from above about 135° F. The microcrystalline wax, or mixture of two or more of such waxes, is obtained from heavy distillate oils or residual lubricating oils by well-known precipitation procedures. The waxes are obtained from solvent solution by cooling the solution to a temperature within the range of about 40–100° F., the wax product melting at about 150–200° F.

The polymeric olefin material may comprise any olefin polymer, olefin copolymers, or combination of olefin polymers and copolymers. Particularly preferred are olefin polymers and copolymers having Melt Indexes from about 0.5 to about 1,000 grams per 10 minutes by ASTM Method D1238. Olefin materials may, therefore, include polyethylene, polypropylene, polyisobutylene, polybutylene, and copolymers which may include ethylene-vinyl acetate copolymers, ethylene-ethyl acrylate copolymers, and ethylene-isobutylene copolymers; and mixtures of these copolymers and the aforementioned polymers. It is to be understood that other materials known to the art may be added to the basic wax-polymer blend. These include antioxidants, slip additives, anti-static agents, resin type materials such as polyterpenes, hydrocarbon resins, rosins, and rosin derivatives. These materials are generally added to the basic wax-polymer blend to enhance a derived functional property of the film laid down by the final emulsion.

The fatty organic acid employed in combination with the petroleum wax and polymeric olefin material for forming the aforementioned blend may, as previously indicated, be any fatty organic acid having at least about 12 carbon atoms per molecule, and may be vegetable or animal in nature. These acids are preferably saturated (hydrogenated) for obtaining better control of oxidation, which would otherwise induce rancidity and other objectionable qualities. Thus, these acids may preferably range from lauric to behenic acid, including palmitic, stearic, oleic and linoleic acids. Of particular preference are fatty organic acids having from about 16 to about 22 carbon atoms, thus ranging from palmitic to behenic acids. In a preferred application, the fatty acid component present in the aforementioned blend may comprise a mixture of any of the aforementioned fatty acids rather than the presence of only one individual acid.

As previously indicated, the aforementioned wax, polymeric olefin material and fatty organic acid components are formed into a mixture, preparatory to liquefication and blending. This mixture, in general, comprises by weight: from about 5 to about 90, and preferably from about 50 to about 70 percent wax; from about 5 to about 90, and preferably from about 25 to about 45 percent polymeric olefin material; and from about 5 to about 20, and preferably from about 5 to about 15 percent of said fatty organic acid. The thus-formed mixture of the aforementioned components is next heated to a temperature which is sufficiently high for liquefying and forming a blend of the components, but which is not higher than the oxidation temperature of the individual components thereof.

Following the liquefication and the formation of a blend of the aforementioned wax, polymeric olefin material and fatty organic acid components present in the above-described mixture, the resulting blend is then added to water which contains an amine soap-forming agent, i.e. an amine which is capable of forming a soap with the organic acid component present. The amines utilizable for this purpose may be of a wide variety and particularly preferred are derivatives of ethylene oxide and ammonia, such as alkanolamines. Representative of this class of amines are monoethanolamine, diethanolamine, triethanolamine and other types of alkanolamines, such as tetrahydro 1,4 oxazine.

The amine soap-forming agent is, in general, present in the water in an amount from about 2 to about 25, and preferably from about 5 to about 15 percent, by weight. In the combined mixture of the aforementioned liquefied blend and water containing the amine soap-forming agent, the blend is present in an amount from about 2 to about 60, and preferably from about 40 to about 60 percent, by weight, of the total mixture.

The aforementioned combined liquefied blend and water containing the amine soap-forming agent is next subjected to agitation for the purpose of forming an aqueous dispersion of wax and polymer components. While undergoing such agitation, the total combined mixture is maintained at a temperature which is below the foaming temperature of the individual components contained therein. During this agitation, emulsification occurs. However, if the emulsification temperature, maintained during agitation, rises appreciably above 170° F., it is found that excessive foaming occurs. On the other hand, there is no specific lowermost temperature attributable to the limit at which emulsification can occur, such lower temperature limit being governed only by the point at which the liquefied components of the aforementioned blend, instead of being dispersed, will tend to solidify in stringy masses which are incapable of being emulsified. It will be noted that the soap, which is formed by the reaction of the fatty acid component and the amine, acts as a protective colloid to keep the dispersed particles of wax and polymeric olefin material from coalescing, thereby preventing separating and making the emulsion stable.

In forming the aforementioned aqueous dispersion, the liquefied blend or oil phase is added to the water phase (i.e. water containing the amine soap-forming agent). The oil is preferably added below the surface of the water, with maximum agitation to prevent air-entrainment. In this respect, it is found that if air is entrained in the combined oil and water phases, the air tends to undergo emulsification by the amine emulsifying agent, and then the latter is not available for use in combining with the acid to form the desired soap. A thick viscous emulsion results which is not suitable for use as, for example, for protective coatings and the like. The purpose of agitating the aforementioned combined oil and water phases is to break up the oil phase into discrete particles or droplets and to form a pre-dispersion so that when the latter is subjected to subsequent homogenization, these particles will become commingled to the extent that a uniform, smooth, non-separating emulsion is formed.

The aforementioned aqueous dispersion, as previously indicated, is next subjected to homogenization at elevated pressure for the purpose of obtaining a substantially air-free, wax-polyolefin emulsion, suitable for use as protective coatings on selected surfaces. The pressure employed in carrying out the homogenization will depend to a great extent upon the characteristics of the components present in the aqueous dispersion. In general, however, it has been found that pressures from about 1,000 to about 5,000 p.s.i. are most effective for conducting the homogenization.

The following examples will serve to illustrate the preparation of the improved emulsions of the present invention, and also their utility in forming uniform, smooth protective coatings in various applications. It will be understood, of course, that it is not intended that the invention be limited to the particular emulsions shown or to the operations or manipulations involved. Various modifications thereof, as previously indicated, can be employed and will be readily apparent to those skilled in the art.

In accordance with each of the examples of the following table, individual representative new and improved wax-polyolefin emulsions were prepared, with the quantities of each of the components present being expressed in parts by weight. The fatty organic acid comprised a mixture of hydrogenated marine oil fatty acids produced from naturally occurring fish oil containing a mixture of fatty organic acids having from about 12 to about 22 carbon atoms per molecule. The wax-polymeric olefin mixture 1 in formulations A through D, comprised, by weight: (a) 60 percent of a mixture of petroleum-based paraffins having a melting point of about 145° F.–155° F. A.M.P.; (b) 25 percent of ethylene-vinyl acetate copolymer having a comonomer weight ratio of about 72:28 and a Melt Index of about 3; and (c) 15 percent of a polyterpene resin.

In formulation E, the wax-polymeric olefin mixture 2 comprised by weight: (a) 65 percent of petroleum based paraffin having a melting point of 138–140° F.; (b) 20 percent of microcrystalline wax; (c) 7.5 percent of polyethylene; and (d) 7.5 percent of an ethylene-vinyl acetate copolymer, having a comonomer weight ratio of about 82:18 and a Melt Index of about 150. As shown in the table, the amine soap-forming agent employed was tetrahydro-1,4 oxazine. In each instance, the fatty acids and wax-polymeric olefin mixture were heated to a temperature of about 260° F. and blended. The water was heated to a temperature of 145° F. and set in circulation from an open tank to a homogenizer at a pressure from about 100 to about 200 p.s.i., and then back to the open tank which was equipped with an agitator. The amine was added to the water followed by the addition of the wax-polymeric olefin mixture and fatty acid blend. The agitation was effected at a rate which would not permit splashing or air-entrainment to occur by vortexing. The aforementioned wax-polymeric olefin, fatty acid blend was added at a rate which did not permit the tank contents to rise above about 170° F. After the addition of all the components of the aforementioned blend, emulsification was effected at a pressure of 3,000 p.s.i. for the equivalent of one pass (as calculated by the pump rate and the volume being made). The second pass was then made, in this instance, conducting the emulsion through a cooler which reduced the temperature to the range of about 90° F.–110° F. The final wax-polyolefin emulsions obtained had the compositions shown in the table, with the figures expressed in percent by weight.

| Example | A | B | C | D | E |
|---|---|---|---|---|---|
| Hydrogenated marine oil fatty acids | 7.5 | 5.0 | 5.0 | 4.5 | 7.5 |
| Wax-polymeric olefin mixture 1 | 35.5 | 36.0 | 40.0 | 45.0 | |
| Wax-polymeric olefin mixture 2 | | | | | 35.5 |
| Tetrahydro-1,4 oxazine | 2.0 | 1.5 | 1.5 | 1.5 | 2.0 |
| Water | 55.0 | 57.5 | 53.5 | 49.0 | 55.0 |
| | 100.0 | 100.0 | 100.0 | 100.0 | 100.0 |

Examination of each of the emulsions shown in Examples A through E revealed that they were superior to emulsions produced in accordance with the aforementioned prior art processes in that the present emulsions were comprised of relatively smaller size particles, were substantially free of entrained air or foam, and exhibited greater ease of water dispersion on dilution. On a comparative basis, an emulsion was prepared in accordance with the identical formulation of Example D, employing the same procedural technique, but differing in that the liquefied blend of wax, polymeric olefin material and fatty acids were added to the amine-containing water at a rate which permitted the tank contents to rise to about 190° F. (rather than 170° F., as previously practiced). Such procedure, however, was found to produce excessive foaming, which almost doubled the volume of the original liquid and which, on cooling, produced an unusable paste like material containing emulsified air bubbles and therefore unsuitable for use for such purposes as protective coatings.

The emulsions produced in accordance with the formulations and described procedures of Examples A through E, when applied to metal strips, revealed that a uniform, smooth protective coating was obtained, free of entrained air and coarse particles. In accordance with other modifications of the present invention, these emulsions may be employed for such purposes as protective floor coverings, leather finishes, urethane foam mold-release agents, and as protective coatings for various forms of fibrous materials, such as paper, cardboard and the like.

From the foregoing, it will be apparent that the process of the present invention makes possible the production of improved wax-polyolefin emulsions having outstanding characteristics and wide fields of applicability. Furthermore, although the present invention has been described with preferred embodiments, it will be understood that various modifications and adaptations thereof, which will be obvious to those skilled in the art, may be resorted to without departing from the spirit and scope of the invention.

I claim:

1. A method for producing an emulsion, which comprises: forming a mixture comprising, by weight, from about 5 to about 90 percent petroleum wax, from about 5 to about 90 percent of a polymeric olefin material and from about 5 to about 20 percent of a fatty organic acid having at least about 12 carbon atoms per molecule; heating the mixture thus formed to a temperature sufficient to liquefy and form a blend, but not higher than the oxidation temperature, of the components thereof; adding the thus-formed liquefied blend to water containing from about 2 to about 25 percent, by weight, of an amine soap-forming agent; subjecting the resulting mixture, maintained at a temperature which is below the foaming temperature of the components contained therein to agitation to form an aqueous dispersion of wax and polymer components; and subjecting the thus-formed aqueous dispersion to homogenization at elevated pressure to obtain a substantially air-free wax-polyolefin emulsion.

2. A method in accordance with claim 1, wherein said wax has a melting point within the range from about 120° F. to about 200° F.

3. A method in accordance with claim 1, wherein said polymeric olefin material comprises olefin polymers having Melt Indexes from about 0.5 to about 1,000.

4. A method in accordance with claim 1, wherein said fatty organic acid contains from about 16 to about 22 carbon atoms per molecule.

5. A method in accordance with claim 1, wherein said liquefied blend comprises, by weight: from about 50 to about 70 percent wax; from about 25 to about 45 percent polymeric olefin material; and from about 5 to about 15 percent of said fatty organic acid.

6. A method in accordance with claim 1, wherein in the combined mixture of liquefied blend and water, said blend is present in an amount from about 2 to about 60 percent, by weight.

7. A method in accordance with claim 1, wherein in the combined mixture of liquefied blend and water, said blend is present in an amount fro mabout 40 to about 60 percent, by weight.

8. A method in accordance with claim 1, wherein the amine soap-forming agent is present in the water in an amount from about 5 to about 15 percent, by weight.

9. A method in accordance with claim 1, wherein the mixture, formed from the liquefied blend and water containing the amine soap-forming agent, is maintained at a temperature not higher than about 170° F.

10. A method in accordance with claim 1, wherein said homogenization is carried out at a pressure from about 1,000 to about 5,000 p.s.i.

11. A method in accordance with claim 1, wherein said wax comprises a paraffin wax, said polymeric olefin material is selected from the group consisting of polyethylene, ethylene-vinyl acetate copolymer, ethylene-ethyl acrylate copolymer, and their mixtures, said fatty organic acid comprises a hydrogenated marine oil fatty acid, and said amine soap-forming agent comprises an alkanolamine.

References Cited

UNITED STATES PATENTS

| 2,313,144 | 3/1943 | Gomm | 260—23 |
| 2,448,799 | 9/1948 | Happoldt et al. | 260—28.5 |
| 2,504,920 | 4/1950 | Buckman et al. | 260—23 |
| 3,328,326 | 6/1967 | Sawyer et al. | 260—27 |

OTHER REFERENCES

H. Bennett: "Practical Emulsions" (1947), pages 3, 4, 14, 15.

DONALD E. CZAJA, Primary Examiner

D. J. BARRACK, Assistant Examiner

U.S. Cl. X.R.

99—190; 260—28.5, 29.6